United States Patent [19]

Bitzinger et al.

[11] Patent Number: 4,914,572
[45] Date of Patent: Apr. 3, 1990

[54] METHOD FOR OPERATING AN ERROR PROTECTED MULTIPROCESSOR CENTRAL CONTROL UNIT IN A SWITCHING SYSTEM

[75] Inventors: Rudolf Bitzinger, Munich; Walter Engl, Feldkirchen; Siegfried Humml, Penzberg; Klaus Schreier, Penzberg, all of Fed. Rep. of Germany

[73] Assignees: Siemens Aktiengesellschaft, Berlin and Munich, Fed. Rep. of Germany

[21] Appl. No.: 24,759

[22] Filed: Mar. 11, 1987

[30] Foreign Application Priority Data

Mar. 12, 1986 [DE] Fed. Rep. of Germany ....... 3608261
Jul. 28, 1986 [DE] Fed. Rep. of Germany ....... 3625498

[51] Int. Cl.⁴ .................. G06F 11/00; G06F 15/16
[52] U.S. Cl. .................. 364/200; 364/228.1; 364/228.3; 364/265; 364/267; 364/267.4; 364/267.7; 364/268.3; 364/244.6; 379/10; 379/269; 379/279
[58] Field of Search ... 364/200 MS File, 900 MS File; 379/10, 269, 279

[56] References Cited

U.S. PATENT DOCUMENTS

| | | | |
|---|---|---|---|
| 3,576,541 | 4/1971 | Kwan | 364/200 |
| 3,768,074 | 10/1973 | Sharp et al. | 364/200 |
| 3,814,919 | 6/1974 | Repton et al. | 364/200 |
| 3,864,670 | 2/1975 | Inoue et al. | 364/200 |
| 3,898,621 | 8/1975 | Zelinski et al. | 364/200 |
| 4,371,754 | 2/1983 | De et al. | 371/10 |
| 4,390,953 | 6/1983 | Johnstone | 364/900 |
| 4,439,826 | 3/1984 | Lawrence | 364/200 |
| 4,443,849 | 4/1984 | Ohwada | 364/200 |
| 4,453,210 | 6/1984 | Suzuki et al. | 364/200 |
| 4,751,703 | 6/1988 | Picon et al. | 371/10 |

FOREIGN PATENT DOCUMENTS 33347921 11/1984 Fed. Rep. of Germany .
2106176 9/1979 United Kingdom .

OTHER PUBLICATIONS

IEEE Intl. Conf. on Comm., May, 1984, Beuscher et al.
Telecom Report, Mar./Apr. 1984, No. 2, Knapek et al.
GTE Journal, vol. 20, Mar./Apr. 1982, Bassett et al.
8th Annual Symposium on Comp. Architecture, May 1981, Geitz et al.

Primary Examiner—Raulfe B. Zache
Assistant Examiner—Emily Y. Chan
Attorney, Agent, or Firm—John F. Moran

[57] ABSTRACT

A method provides error protection in a multiprocessor central control unit of a switching system wherein a number of central processors (CP, IOC) as well as a central memory (CMY) are connected in parallel to a central bus system (B:CMY0/B:CMY1). The processors include dual highly-synchronous parallel driven processor units (PU) —apart from a possible tolerable positive timing slip—and integral error detection circuits (V), as well as an integral local memory (LMY), in the ROM-area of which test program sections are stored for testing the respective processors (CP, IOC). Upon the detection of an error by at least one of the error detection circuits (V) of a processor (for example CPx), in the respective processor (CPx), at least if the error is not immediately correctable, the error detection circuit (V in CPx) starts isolating the respective processor (CPx) from the bus system (B:CMY). The respective processor (CPx) starts the read-out of the test program sections, stored in its own local memory (LMY), for localizing and identifying the error source and/or the defect causing such errors.

10 Claims, 1 Drawing Sheet

METHOD FOR OPERATING AN ERROR PROTECTED MULTIPROCESSOR CENTRAL CONTROL UNIT IN A SWITCHING SYSTEM

BACKGROUND OF THE INVENTION

This invention relates to further aspects of a particular method for operating a multiprocessor as a central control unit of a switching system. European patent application No. 141 245 discloses this kind of switching system. The error or defect detection for error protection of a dual processor module of such a processor can, for example, be accomplished in accordance with the European patent application No. 140 155. Both these European applications correspond to U.S. patent application Ser. No. 657,954 now U.S. Pat. No. 4,598,687 filed Sept. 19, 1984.

Such a central control unit must be extremely tolerant of errors, that is, errors or defects that occur, should be rapidly detected and defective as well as suspected elements, for example, processors of the central control unit, rapidly eliminated before additional errors result from the error or defect, which can affect the operation of the switching system. For that reason not only the processor unit, but the bus system and the memory blocks of the central memory are normally redundant or doubled in these central control units and protected against errors through precise synchronous parallel operation, apart from a possible tolerable timing slip between these "synchronous parallel" driven components.

Furthermore, such a central control unit, despite its extremely high error tolerance must also exhibit an extremely high availability, that is, any outage time or downtime of the entire central control unit must be limited to less than a few seconds or minutes per year despite uninterrupted operation. A failure in one of the central processors of the central control unit should almost never be allowed to result in a more or less extensive collapse of the switching operation.

An object of the present invention is to increase the reliability of the central processors utilized in central control units.

A primary object of the invention is, therefore, to insure a high degree of tolerance for errors by self testing of the processors and therewith, the maintenance of the actual uninhibited operation.

A further object of the invention is to raise the availability and reliability of the switching operations.

SUMMARY OF THE INVENTION

A feature of the present invention is to provide an arrangement wherein a processor that is error/defect suspect, perhaps already when only one single error has occurred, is isolated from the bus system, whereupon it tests itself without external assistance.

Further illustrative embodiments of the invention enable particularly elegant operating variations of this processor, whereby the error tolerance and also the operation of the central control unit be further enhanced. If, for example, the processor in question does not detect a permanent error/defect during self testing, it is capable of reconnecting itself to the bus system. If, however, it detects a permanent error/defect during this self test, it remains isolated from the bus system. Since typically there are several of such independent processors each capable of similar continuous operation in switching activity in a redundant manner at the same time, one or more of the processors connected to the bus system are able, at all times, to take over the assignments of each defective processor which remains isolated. Thus the central control unit generally continues to remain operational to a greater extent despite the long term isolation of one or even a number of processors.

The invention, therefore, prevents the propagation of errors occurring in the processors into the remaining operation of the rest of the central control unit, and thereby into the operation of the entire switching system. The error propagation is rapidily and dependably stopped. Therefore, the switching system is made particularly tolerant of errors, and highly available and highly reliable.

Additional embodiments of the invention permit the operation of the respective defective or error suspect processor, to be further improved. In one embodiment of the invention, the re-establishment of the full original and total operation of the central control unit continues when only a sporadic single timing error is detected, at minimum expense, i.e. simply by means of a command stored in local memory. In a further illustrative embodiment of the invention, the subsequent repair of the defective portion of the processor that has been identified in more or less detail, localized and/or typified through self testing is made easy for the subsequent maintenance, at least positive indications allowing localization are provided, rendering unnecessary to affect a random exchange of the entire respective processor for a repair. In a still further embodiment of the invention the further processing of the test program renders unnecessary as soon as the command at which this test program was interrupted is already logged in the diagnostic register (REG).

Additionally, an embodiment of the invention utilizes the timely elimination of a erroring processor so that in the interest of avoiding loss of time it no longer receives switching instructions. In another embodiment, a simplification of remote error diagnosis of the processors is provided. Restrictions on the total operation of the central control unit may be avoided even during the occurrence of an error in a processor unit. The switching operations may continue until the next maintenance of the central control unit by on-site inspection.

BRIEF DESCRIPTION OF THE DRAWING

Further features and embodiments of the invention and additional objects thereof will be more readily appreciated and better understood by reference to the following detailed description which should be considered in conjunction with the drawing.

An illustrative embodiment of a central control unit is depicted in the sole FIGURE. This type of central control unit is very similar to the type shown in the FIGURE and discussed in the description of the following German patent applications control unit, described in the additional German patent applications P 33 34 773.5, P 33 34 792.1, P 33 34 765.4, P 33 34 766.2, P 33 34 797.2, and P 33 34 796.4. All these German applications correspond to the aforementioned U.S. patent application Ser. No. 657,954 as well.

Figure 1:
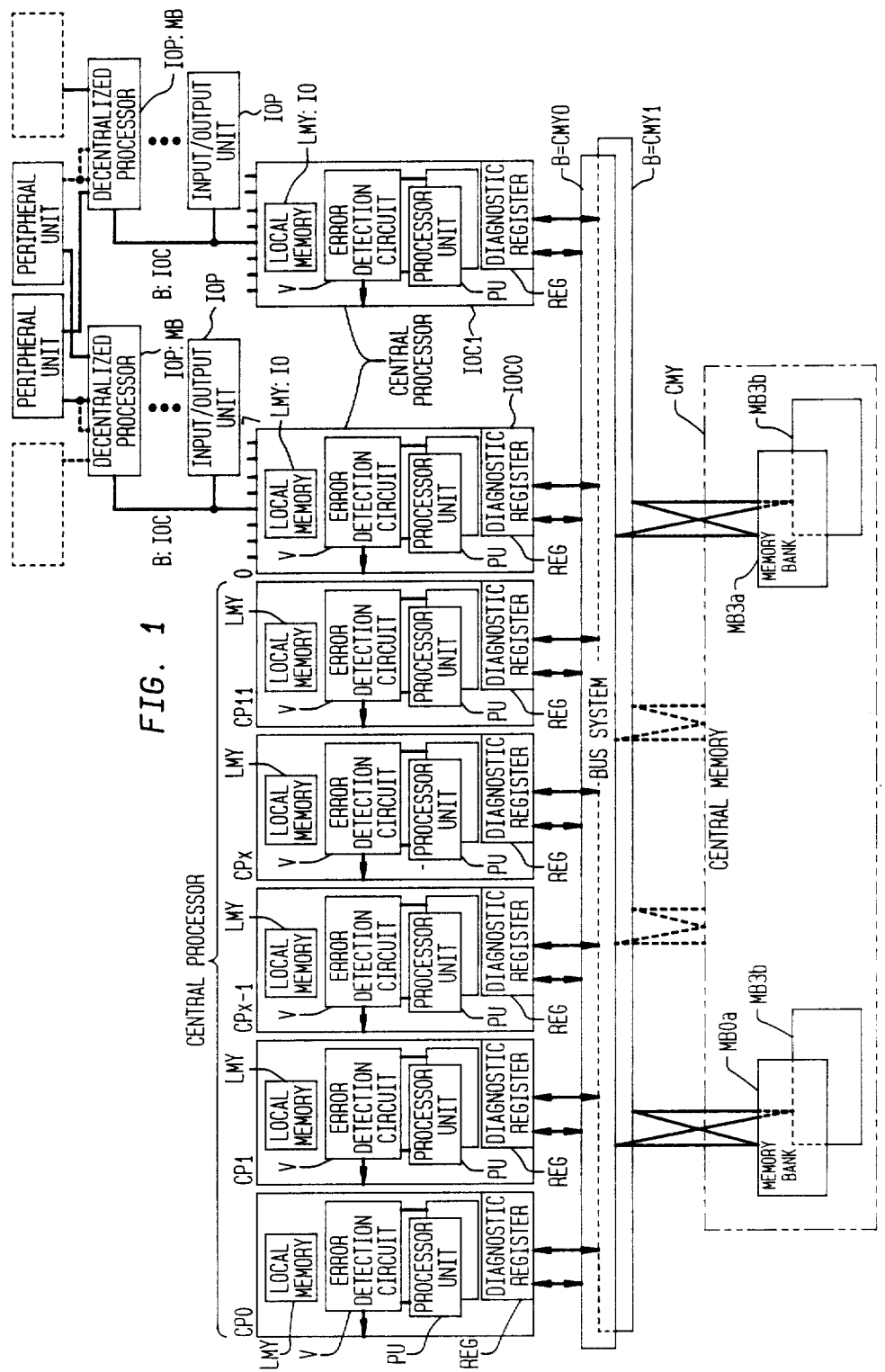

In the foregoing German patent applications, however, only various other aspects are addressed related to objects and/or aspects which are different from the present invention. The invention is applicable to all of these applied arrangements. Therefore, since the principles and general characteristics are previously known and described in detail in these prior patent applications, it is unnecessary to describe the construction and operation of the present central control unit in complete detail again. Instead it is adequate to discuss only upon the particular matters and techniques as they relate in accordance with the present invention.

DETAILED DESCRIPTION

The sole FIGURE includes central processors designated CP0 ... CP11, IOC0, IOC1 ..., with integrated redundant processor building blocks, PU, e.g. with integrated double 32-bit microprocessor chips PU. These processor units PU are driven in synchronous step in parallel, apart from a possible tolerable timing slip, and therefore carry out the actual error protected interconnects, for which purpose they contain, or have been associated with, at least one independent error detection circuit, e.g. EDC circuits, parity-bit networks and/or comparison circuits V, particularly for the immediate checking of instructions which includes commands and/or data being processed by both processor units PU, of the respective processor. Each of the processors CP, IOC contains individual local memory LMY, LMY:IO, with a RAM section and in particular a ROM section, i.e. a PROM section, which store at least partially similar error diagnostic programs namely test program sections for self testing the respective processor, and which store switching program sections, in particular the most frequent and/or most quickly needed switching program sections required by the respective processor CP, IOC.

The central memory CMY, to which the central processors CP, IOC have access over the dual bus system B:CMY0/B:CMY1, store at least various seldom and/or not immediately needed switching program sections required by a central processor CP, IOC, as well as data—accessible at least temporarily—for several or for all processors CP, IOC which data concern a multiplicity of connections existing at that time, and concern peripheral system device features.

As soon as an error is detected by at least one of the error detection circuits, for instance, by one of the processor comparison circuits V in the respective processor, for example in CPx, at least if this error is not easily correctable, the output signal of the respective error detection circuit, starts a process to isolate the respective processor CPx from the bus system B:CMY0/B:-CMY1, e.g. by means of an I/O unit, and starts the read-out of the respective test program section for such trouble, stored in the ROM-part of the local memory LMY (and/or LMY:IO). Thereupon the two processor units PU of this processor CPx begin to process this test program for the more specific location and/or typfication of the respective error or of the defect which causes such errors. Through the isolation of the respective processor CPx, the propagation of the error through the entire switching system is avoided. In other words, a high tolerance for errors is achieved. The immediately introduced self testing simplifies the subsequent error diagnosis for maintenance service staff, and the possible repair necessary is very specific, and in general limited to a small portion or section of the respective processor. In the event that no indication of an error/defect is established during test processing, the respective processor CPx reconnects itself again, preferably on its own, with the bus system B:CMY0/B:-CMY1, so that the original extremely high operational availability is restored to provide a minimum of downtime.

The subsequent failure diagnosis of the defective processor is also especially rapidly and simply possible if, in the event that an indication of an error/defect is established during test processing, an error code corresponding to this error/defect for example, the address of the related test program section command, is stored in a diagnostic register REG of the respective processor CPx.

When an error/defect has been adequately localized and/or typified, it is even possible, immediately after storing the error code, to interrupt processing of the test program.

If the defective processor CPx is simply left isolated from the bus system B:CMY it may immediately be by-passed during the normal distribution of switching commands so that the isolation does not result in a loss of time for the entire switching system whereby the effect of the isolation on the operation of the central control unit remains very limited.

The remote diagnosis of all errors/defects and the corresponding appropriate preparation for the subsequent servicing of the central control unit is possible, by means of a special processor, at an operation and maintenance station for example, which may access over the bus system B:CMY0/B:CMY1 at least to each respective processor CPx, although this respective processor CPx is isolated from the bus system B:CMY0/B:CMY1, for interrogating the contents of its diagnostic register REG via a special interrogating code.

In the event that a direct indication of the error/-defect of only one of the two processor units PU occurred, e.g. by an associated EDC circuit or an associated parity bit network of this respective processor unit PU, this respective processor unit PU alone, may be isolated and normal processor operation may be maintained via the other processing unit PU of this respective processor, thus leaving the central control unit in its previous high state of availability. It is also desirable, during that isolation of the single processor unit PU, to log an indication of this condition for the maintenance service staff, for example, again in the diagnostic register REG which may even be remotely interrogated by the operation and maintenance station. The repair of this processor may then be included in preparing procedures for the subsequent maintenance.

There has thus been shown and described a novel arrangement and technique for providing error protection in multiprocessor central control unit of a switching system which fulfills all the objects and advantages sought therefore. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

We claim:

1. A method of operating an error protected high availability multiprocessor serving as a central controller of a switching system providing inter-connections to subscribers, particularly a telephone switching system, the central controller comprising:

(a) a plurality of central processors (CP, IOC), each central processor including dual, apart from a possible tolerable timing slip, parallel synchronously driven processor units (PU) for carrying out the inter-connections to subscribers connected to said switching system, including at least one integral error detection circuit (V) for immediately checking instructions processed by both of the dual processor units (PU) of the respective processor, and including a local memory (LMY, LMY:10) having a ROM-section, storing test program sections for self testing of the respective processor (CP, IOC), and storing switching program sections required most frequently and most quickly by the respective processor (CP, IOC), (b) a central main memory (CMY) including a ROM-area storing at least seldom and not immediately required (CP, IOC) switching program sections, and including a memory-area storing at least temporarily data accessible for a number of or for all processors (CP, IOC), whereby such data concern inter-connections between subscribers and concern peripheral system elements, and (c) a central bus system (B:CMY) to which are connected in parallel the processors (CP, IOC) and the main memory (CMY), after detecting an error by at least one of the error detection circuits (V) or a processor (CPx, for example), at least if this error is not immediately correctable, the method comprising the steps:

(a) isolating the respective processor (CPx) from the bus system (B:CMY);

(b) starting to read-out test program sections stored in ROM-section of its own local memory (LMY, LMY:IO) by the respective processor (CPx); and (c) processing this test program for localization and identification of the error and a defect causing such errors by the respective processor (CPx).

2. A method in accordance with claim 1, further comprising the step:

(d) reconnecting the respective processor (CPx) to the bus system (B:CMY) if no indication of an error and/or defect is detected during the processing of the test program.

3. A method in accordance with claim 1, further comprising the step:

(d) storing an error code obtained from its own local memory corresponding to this error/defect in an integral diagnostic register (REG) of the respective processor (CPx) if an indication of an error and/or defect is detected during processing of the test program.

4. A method in accordance with claim 3, said error code indicative of an address of that test program command or of those test program commands, at which the respective error defect was localized and identified.

5. A method in accordance with claim 3, further comprising the step:

(e) interrupting the processing of the test program by the respective processor (CPx) after the error code is stored.

6. A method in accordance with claim 3, further comprising the step:

(f) maintaining isolation of the respective processor (CPx) after the error code is stored.

7. A method in accordance with claim 6, further comprising accessing each processor (CPx) isolated from the bus system (B:CMY) via a special code by a particular processor and interrogating the contents of the diagnostic register (REG) of this isolated processor (CPx) to diagnose the processor being isolated.

8. A method in accordance with claim 1, further comprising the step:

directly monitoring each of the dual processor units (PU) by each error detection circuit and directly indicating an error or a defect in a respective one of the dual processor units (PU isolating the respective processor unit (PU) alone, whereby the normal processor operations are maintained via the other processor unit (PU) along within this respective processor.

9. A method in accordance with claim 8, further comprising storing an indication of this isolated one of the processor units (PU) in a diagnostic register of the respective processor.

10. A method in accordance with claim 5, wherein a special processor accesses each processor (CPx) isolated from the bus system (B:CMY0/B:CMY1) via a special code, and interrogates the contents of the diagnostic register (REG) to diagnose the processor being isolated.

* * * * *